United States Patent
Miller (10) Patent No.: US 9,527,153 B2
(45) Date of Patent: Dec. 27, 2016

(54) CAMERA AND WIRE FEED SOLUTION FOR ORBITAL WELDER SYSTEM

(71) Applicant: Lincoln Global, Inc., City of Industry, CA (US)

(72) Inventor: Victor Miller, Jamul, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 836 days.

(21) Appl. No.: 13/830,945

(22) Filed: Mar. 14, 2013

(65) Prior Publication Data
US 2014/0263249 A1     Sep. 18, 2014

(51) Int. Cl.
B23K 9/095    (2006.01)
B23K 9/028    (2006.01)
B23K 9/12     (2006.01)
B23K 9/32     (2006.01)

(52) U.S. Cl.
CPC ........... *B23K 9/0956* (2013.01); *B23K 9/0286* (2013.01); *B23K 9/122* (2013.01); *B23K 9/32* (2013.01); *B23K 2201/06* (2013.01)

(58) Field of Classification Search
CPC . B23K 2201/06; B23K 9/0286; B23K 9/0956; B23K 9/32
See application file for complete search history.

(56) References Cited

U.S. PATENT DOCUMENTS

| | | |
|---|---|---|
| 1,114,793 A | 10/1914 | Murray |
| 1,704,846 A | 3/1929 | Stresau |
| 2,138,837 A | 12/1938 | Cadman |
| 2,515,302 A | 7/1950 | Hughey |
| 2,547,872 A | 4/1951 | Kissick |

(Continued)

FOREIGN PATENT DOCUMENTS

| | | |
|---|---|---|
| CA | 2422134 | 9/2004 |
| CN | 2675323 | 2/2005 |

(Continued)

OTHER PUBLICATIONS

Polysoude The Art of Welding, Tig—With or without Filler Wire, AVC, OSC, Open Welding Head for Welding of Tube to Tube Joints, Tube to Elbow Joints . . . , Polysoude S.A.S. France (Mar. 2011).

(Continued)

*Primary Examiner* — David Angwin
*Assistant Examiner* — Amit K Singh
(74) *Attorney, Agent, or Firm* — Foley & Lardner LLP (57) ABSTRACT

The technology described herein generally pertains to a system related to a camera device and wire guide system that includes a bracket for a wire guide and a camera device, wherein the bracket aligns the camera device to aim on a position of a welding zone for an orbital welding system. In particular, the bracket supports a wire guide to be positioned on a welding zone while also supporting a camera device that can be positioned on the welding zone. The bracket enables the welding zone to be captured by the camera device and is centered on the wire guide to remain positioned on the welding zone. The bracket provides placement of a camera device to provide video/camera visibility of the welding zone while allows adjustment of the camera device with wire location adjustment or independent of wire location adjustment.

7 Claims, 9 Drawing Sheets

(56) References Cited

U.S. PATENT DOCUMENTS

| | | |
|---|---|---|
| 2,710,328 A | 6/1955 | Semple |
| 2,795,689 A | 6/1957 | McNutt |
| 2,806,125 A | 9/1957 | Miller |
| 2,845,524 A | 7/1958 | Morley, Jr. |
| 3,048,691 A | 8/1962 | Longstreth |
| 3,137,782 A | 6/1964 | Rieppel et al. |
| 3,179,781 A | 4/1965 | Ross |
| 3,207,881 A | 9/1965 | Pagan |
| 3,235,705 A | 2/1966 | Agnew et al. |
| 3,239,648 A | 3/1966 | Syrigos |
| 3,323,752 A | 6/1967 | Kurtz et al. |
| 3,427,428 A | 2/1969 | Nelson et al. |
| 3,542,996 A | 11/1970 | Bollinger |
| 3,567,900 A | 3/1971 | Nelson et al. |
| 3,576,966 A | 5/1971 | Sullivan |
| 3,602,687 A | 8/1971 | Pollock |
| 3,604,039 A | 9/1971 | Aldridge |
| 3,718,798 A | 2/1973 | Randolph et al. |
| 3,737,614 A | 6/1973 | Paulange |
| 3,806,691 A | 4/1974 | Roach |
| 3,806,694 A | 4/1974 | Nelson et al. |
| 3,815,807 A | 6/1974 | Bartley |
| 3,826,888 A | 7/1974 | Garfield et al. |
| 3,835,286 A | 9/1974 | Kazlauskas |
| 3,839,619 A | 10/1974 | Normando et al. |
| 3,852,943 A | 12/1974 | Healy |
| 3,873,798 A | 3/1975 | Friedman et al. |
| 4,091,258 A | 5/1978 | Kano et al. |
| 4,132,338 A | 1/1979 | Bove et al. |
| 4,153,142 A | 5/1979 | Spisz |
| 4,161,640 A | 7/1979 | Bromwich et al. |
| 4,168,406 A | 9/1979 | Torrani |
| 4,196,333 A | 4/1980 | Emmerson |
| 4,216,365 A | 8/1980 | Peyrot |
| 4,255,641 A | 3/1981 | Connell et al. |
| 4,282,771 A | 8/1981 | Grube |
| 4,298,783 A | 11/1981 | Schneider et al. |
| 4,300,034 A | 11/1981 | Schneider et al. |
| 4,327,898 A | 5/1982 | Grant et al. |
| 4,331,278 A | 5/1982 | Sherer et al. |
| 4,343,983 A | 8/1982 | Schneider et al. |
| 4,346,279 A | 8/1982 | Lessmann et al. |
| 4,347,421 A | 8/1982 | Mukuda et al. |
| 4,380,695 A | 4/1983 | Nelson |
| 4,386,726 A | 6/1983 | Taff |
| 4,455,471 A | 6/1984 | Ecer et al. |
| 4,495,401 A | 1/1985 | Sidorov et al. |
| 4,515,533 A | 5/1985 | Gomez |
| 4,562,334 A | 12/1985 | Brandt |
| 4,591,685 A | 5/1986 | Hinger et al. |
| 4,672,163 A | 6/1987 | Matsui et al. |
| 4,687,899 A | 8/1987 | Acheson |
| 4,728,974 A | 3/1988 | Nio et al. |
| 4,761,596 A | 8/1988 | Nio et al. |
| 4,841,118 A | 6/1989 | Overbay |
| 4,856,165 A | 8/1989 | Reuchlein et al. |
| 4,891,493 A | 1/1990 | Sato et al. |
| 4,891,494 A | 1/1990 | Baujat |
| 4,896,812 A | 1/1990 | Kazlauskas |
| 4,918,517 A * | 4/1990 | Burgoon .............. H04N 7/18 348/335 |
| 4,986,002 A | 1/1991 | Oros et al. |
| 5,099,098 A | 3/1992 | Burgoon |
| 5,155,330 A | 10/1992 | Fratiello et al. |
| 5,220,144 A | 6/1993 | Jusionis |
| 5,227,601 A | 7/1993 | Black |
| 5,642,898 A | 7/1997 | Wise |
| 5,692,700 A | 12/1997 | Bobeczko |
| 5,710,403 A | 1/1998 | Jusionis |
| 5,981,897 A * | 11/1999 | Offer .................. B23K 9/164 219/136 |
| 6,029,940 A | 2/2000 | Klein |
| 6,091,048 A | 7/2000 | Lanouette et al. |
| 6,201,207 B1 | 3/2001 | Maruyama et al. |
| 6,271,495 B1 | 8/2001 | Rooney |
| 6,380,505 B1 | 4/2002 | Stoops et al. |
| 6,429,405 B2 | 8/2002 | Belloni et al. |
| 6,479,795 B1 | 11/2002 | Albrecht et al. |
| 6,512,195 B2 | 1/2003 | Domschot |
| 6,609,679 B1 | 8/2003 | Seidel |
| 6,617,548 B1 | 9/2003 | Bosio |
| 6,657,161 B2 | 12/2003 | Marhofer et al. |
| 6,696,012 B1 | 2/2004 | Theriot |
| 6,953,909 B2 | 10/2005 | Marhofer et al. |
| 7,034,250 B2 | 4/2006 | Kensrue |
| 7,114,732 B1 | 10/2006 | Ismail |
| 7,176,411 B2 | 2/2007 | Enyedy |
| 7,205,500 B2 | 4/2007 | Watanabe et al. |
| 7,208,699 B2 | 4/2007 | Stanzel |
| 7,252,297 B1 | 8/2007 | Barritt et al. |
| 7,309,845 B2 | 12/2007 | Domschot |
| 7,411,147 B2 | 8/2008 | Stanzel et al. |
| 7,414,220 B2 | 8/2008 | Oyster et al. |
| 7,423,238 B2 | 9/2008 | Stanzel et al. |
| 7,455,472 B2 | 11/2008 | Lehner et al. |
| 7,566,038 B2 | 7/2009 | Scott et al. |
| 7,755,000 B2 | 7/2010 | Stanzel |
| 7,952,045 B2 | 5/2011 | Tsurui et al. |
| 8,096,921 B2 | 1/2012 | Hahn |
| 8,143,549 B2 | 3/2012 | King, III et al. |
| 8,167,322 B2 | 5/2012 | Greene |
| 8,256,659 B2 | 9/2012 | Enyedy et al. |
| 8,278,601 B2 | 10/2012 | Stanzel |
| 8,338,752 B2 | 12/2012 | Enyedy et al. |
| 8,357,876 B1 | 1/2013 | Allford et al. |
| 8,393,059 B2 | 3/2013 | Dunn |
| 2001/0015349 A1 | 8/2001 | Belloni et al. |
| 2001/0047988 A1 | 12/2001 | Hiraoka et al. |
| 2002/0153363 A1 | 10/2002 | Hiraoka et al. |
| 2004/0065644 A1 | 4/2004 | Hiraoka et al. |
| 2004/0094514 A1 | 5/2004 | Nista et al. |
| 2005/0098551 A1 | 5/2005 | Hiraoka et al. |
| 2005/0269313 A1 | 12/2005 | Vinegar et al. |
| 2006/0076320 A1 | 4/2006 | Watanabe et al. |
| 2007/0012671 A1 | 1/2007 | Hiraoka et al. |
| 2007/0119829 A1 | 5/2007 | Vietz et al. |
| 2007/0297556 A1 | 12/2007 | Spencer et al. |
| 2008/0197116 A1 | 8/2008 | Achtner et al. |
| 2008/0230526 A1 | 9/2008 | Hiraoka et al. |
| 2008/0283510 A1 * | 11/2008 | Chagnot .............. G01N 21/952 219/121.83 |
| 2009/0039059 A1 | 2/2009 | Twarog et al. |
| 2009/0242352 A1 | 10/2009 | Altonji et al. |
| 2010/0133239 A1 | 6/2010 | Gunzelmann |
| 2010/0183360 A1 | 7/2010 | Nguyen et al. |
| 2010/0193571 A1 | 8/2010 | Gunzelmann |
| 2011/0042365 A1 | 2/2011 | Hiraoka et al. |
| 2011/0072874 A1 | 3/2011 | Basler et al. |
| 2011/0114613 A1 | 5/2011 | Ihde |
| 2011/0114616 A1 | 5/2011 | Albrecht |
| 2011/0117527 A1 * | 5/2011 | Conrardy .............. B23K 9/0956 434/234 |
| 2011/0132877 A1 | 6/2011 | Miller et al. |
| 2012/0118864 A1 | 5/2012 | L'Arvor et al. |
| 2013/0126494 A1 | 5/2013 | Miller et al. |
| 2013/0199323 A1 | 8/2013 | Fong et al. |

FOREIGN PATENT DOCUMENTS

| | | |
|---|---|---|
| CN | 102974960 | 3/2013 |
| DE | 965794 C | 6/1952 |
| DE | 965794 | 6/1957 |
| DE | 3238496 | 10/1982 |
| EP | 0025989 | 9/1980 |
| EP | 1779963 | 2/2007 |
| EP | 2020272 | 2/2009 |
| EP | 2106872 | 10/2009 |
| EP | 2216120 | 8/2010 |
| EP | 2216122 | 8/2010 |
| EP | 2216123 | 8/2010 |
| EP | 22216121 | 8/2010 |
| EP | 2495817 | 9/2012 |
| GB | 848941 | 9/1960 |
| GB | 1142854 | 2/1969 |

(56) References Cited

FOREIGN PATENT DOCUMENTS

| | | |
|---|---|---|
| GB | 1272568 | 5/1972 |
| JP | 55100877 | 8/1980 |
| JP | S6199581 A | 5/1986 |
| JP | H02255272 | 10/1990 |
| JP | H07111759 | 10/1993 |
| JP | H0641972 | 6/1994 |
| JP | H09285867 | 11/1997 |
| JP | H11197841 | 7/1999 |
| KR | 201000129435 | 12/2010 |
| KR | 20120025801 A | 3/2012 |
| NL | 7401239 | 1/1974 |
| SU | 322247 | 9/1970 |
| WO | 95/23060 | 8/1995 |
| WO | 03/044375 A1 | 5/2003 |
| WO | 2008025553 A2 | 8/2007 |
| WO | 2010/089184 | 8/2010 |
| WO | 2012020249 A2 | 2/2012 |
| WO | 2012/097626 | 7/2012 |

OTHER PUBLICATIONS

PCT/IB2014/000300 International Search Report & Written Opinion, Sep. 12, 2014, 9 pages.
Using compact, full-function weld heads; 2013 Limited Clearance/Arc Machines, Inc., 10500 Orbital Way, Pacoima, CA91331; Mar. 14, 2013.
Accra Wire Website, section on Weld Wire Dereelers, http://www.accuainc.com/weldwire.html, 3 pages, retrieved Nov. 13, 2014.

\* cited by examiner

CAMERA AND WIRE FEED SOLUTION FOR ORBITAL WELDER SYSTEM

TECHNICAL FIELD

In general, the present invention relates to a camera and mounting device used in connection with an orbital welding system. More particularly, the present invention relates to a camera mounting device that couples to a portion of a welding system while providing versatile adjustment for a camera to focus on a welding zone.

BACKGROUND OF THE INVENTION

In industrial applications, welding may involve, raising, cladding, building up, filling, hard facing, overlaying, joining, and other welding applications. When confronted with a workpiece having a curved surface, an orbital welding processes may be used to rotate the welding head to apply a weld to the curved surface. The most common examples, where orbital welding is used, is the welding of pipe. Pipe welding may include thin wall application where the welding head is rotated about the other surface two piece ends being joined together, alternatively, pipe welding may include deep grove geometries where the welding electrode extends into a grove formed between the two pipes being joined to lay down successive beads of weld material to fill the grove the join the thick walled pipes. Orbital welding systems may include a welding head that is mounted on a guide track or a fixture that clamps or is otherwise supported on the workpiece and rotated to supply a weld. With orbital welding often involves limited visibility of a welding zone with lead cameras and/or trailing cameras.

Orbital welding systems can be compromised by the deep grove geometries and curvature associated with a workpiece and what is needed is an improved technique to related to orbital welding systems.

SUMMARY OF THE INVENTION

In accordance with an embodiment of the present invention, a welding system is provided that an orbital welder having a chassis that is attached to a workpiece and supported on a portion of track affixed to the workpiece and a welding torch coupled to the chassis that includes an electrode an electrode adapted to form a weld joint on the workpiece. The welder system further includes a wire feeder that is connected to a supply of welding wire to provide welding wire to a wire guide to a welding zone at which the electrode deposits weld material on the workpiece. In accordance with the aspect, the welder system includes a bracket coupled to the chassis that comprises includes a first arm in a first plane, wherein a portion of the first arm is adapted to focus a camera device on the welding zone and a second arm having an offset portion lying in a second plane separated by a distance from the first plane defining a recess to receive at least a portion of the camera device, wherein the second arm includes a wire guide mount that supports the wire guide in the first plane to provide the welding wire to the welding zone.

In accordance with an embodiment of the present invention, a bracket for mounting a camera device to a welder system is provided that includes a first arm situated in a first plane that includes a top portion and a bottom portion opposite thereof. In accordance with the bracket, the bottom portion includes a camera device mount that receives a first portion of a camera device, wherein the camera device is positioned to aim at a welding zone. The bracket further includes a second arm having an offset portion lying in a second plane separated by a distance from the first plane to define a recess to receive a second portion of the camera device, wherein the second arm includes a wire guide mount that supports the wire guide in the first plane to provide a portion of welding wire to the welding zone. With the bracket, a center point of the camera mount device lies in the same plane as a center point of the wire guide mount.

In accordance with an embodiment of the present invention, an orbital welding system is provide that includes an orbital welder having a chassis that is attached to a workpiece and supported on a portion of track affixed to the workpiece and a welding torch coupled to the chassis that includes an electrode adapted to form a weld joint on the workpiece. The orbital welding system further includes a wire feeder that is connected to a supply of welding wire to provide welding wire to a wire guide to a welding zone at which the electrode deposits weld material on the workpiece. In accordance with the orbital welding system, a bracket coupled to the chassis is provided that includes a first arm in a first plane, wherein a portion of the first arm is adapted to focus a camera device on the welding zone and a second arm having an offset portion lying in a second plane separated by a distance from the first plane defining a recess to receive at least a portion of the camera device, wherein the second arm includes a wire guide mount that supports the wire guide in the first plane to aim in a position on the welding zone. In the orbital welding system, the second arm further includes a top portion and a bottom portion opposite thereof, a first transition that transitions from the top portion to the offset portion, and a second transition that transitions from the offset portion to at least one of the wire guide mount or the bottom portion, wherein the first transition, offset portion and second transition form a continuous curve.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that relate to camera device and wire guide system that includes a bracket for a wire guide and a camera device, wherein the bracket aligns the camera device to aim on a position of a welding zone for an orbital welding system. In particular, the bracket supports a wire guide to be positioned on a welding zone while also supporting a camera device that can be positioned on the welding zone. The bracket enables the welding zone to be captured by the camera device and is centered on the wire guide to remain positioned on the welding zone. The bracket provides placement of a camera device to provide video/camera visibility of the welding zone while allows adjustment of the camera device with wire location adjustment or independent of wire location adjustment. Moreover, a wire guide and camera device system can include a bracket and a height adjustment device that maneuvers the bracket (and affixed camera device and wire guide) upwards away the welding zone or downwards toward the welding zone.

"Welding" or "weld" as used herein including any other formatives of these words will refer to depositing of molten material through the operation of an electric arc including but not limited to submerged arc, GMAW, MAG, MIG, TIG welding, or any electric arc used with an orbital welding system.

Figure 1:
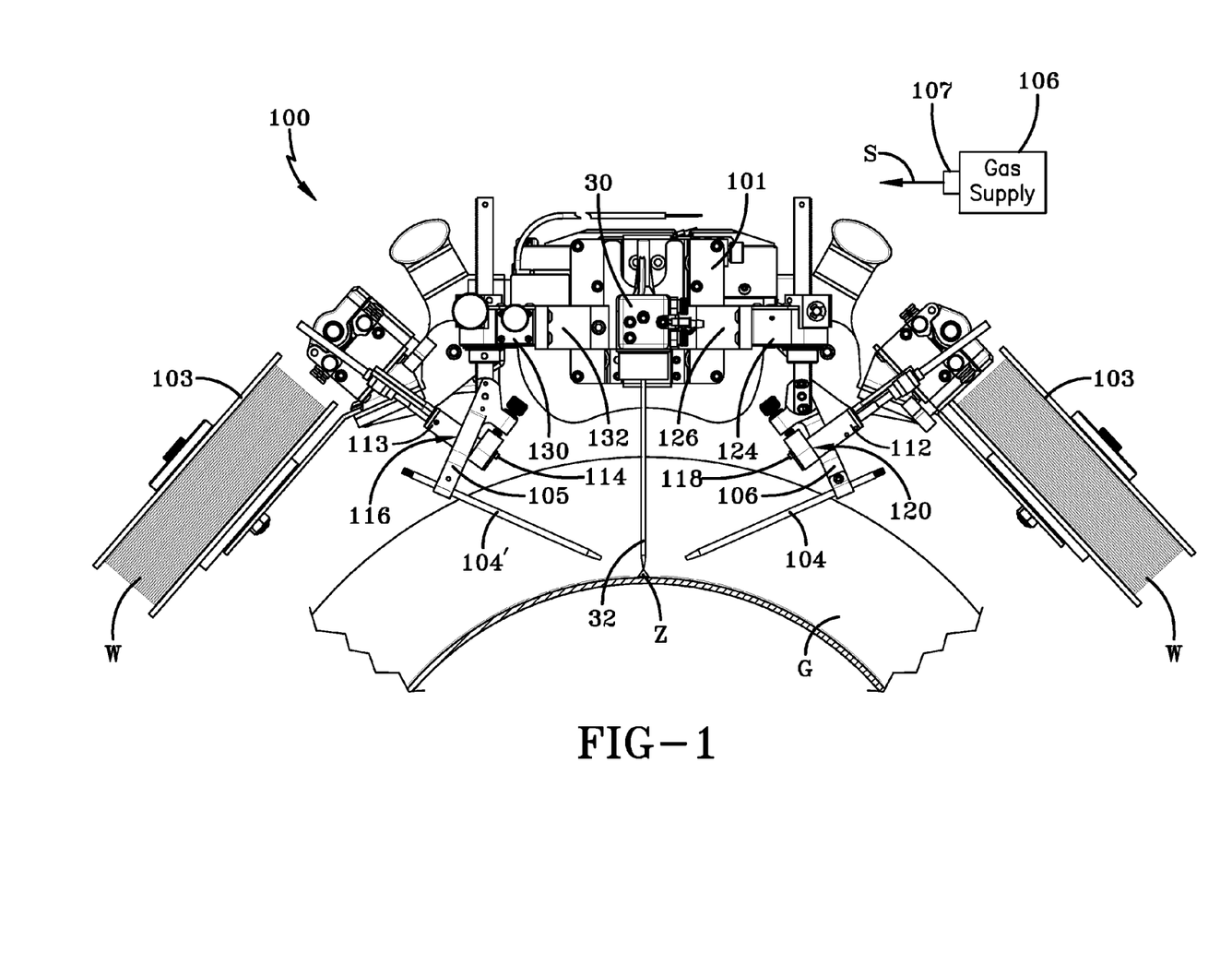
FIG. 1 illustrates a front view of an orbital welding system that includes a first mount system and a second mount system to support a camera device and a wire guide to position on a welding zone.
Figure 2A:
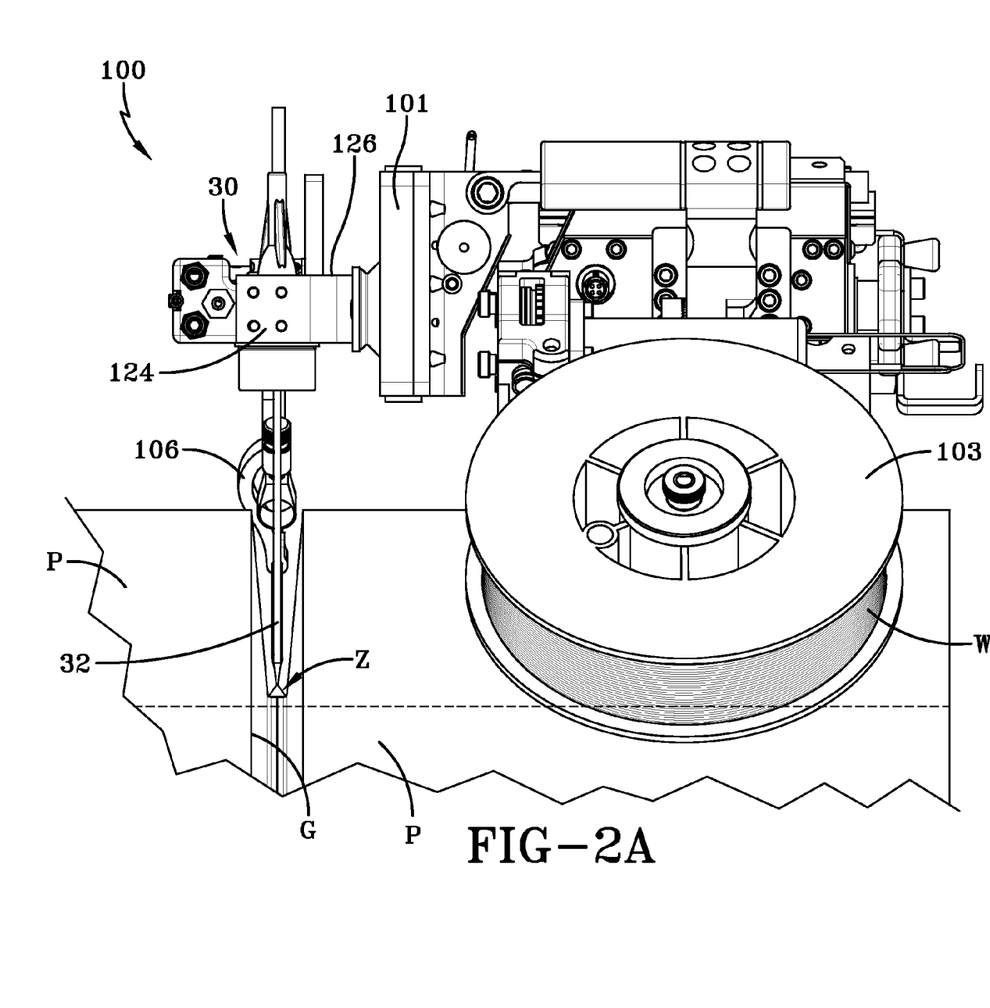
FIG. 2A illustrates a side view of an orbital welding system that includes a first mount system and a second mount system to support a camera device and a wire guide to position on a welding zone.
Figure 2B:
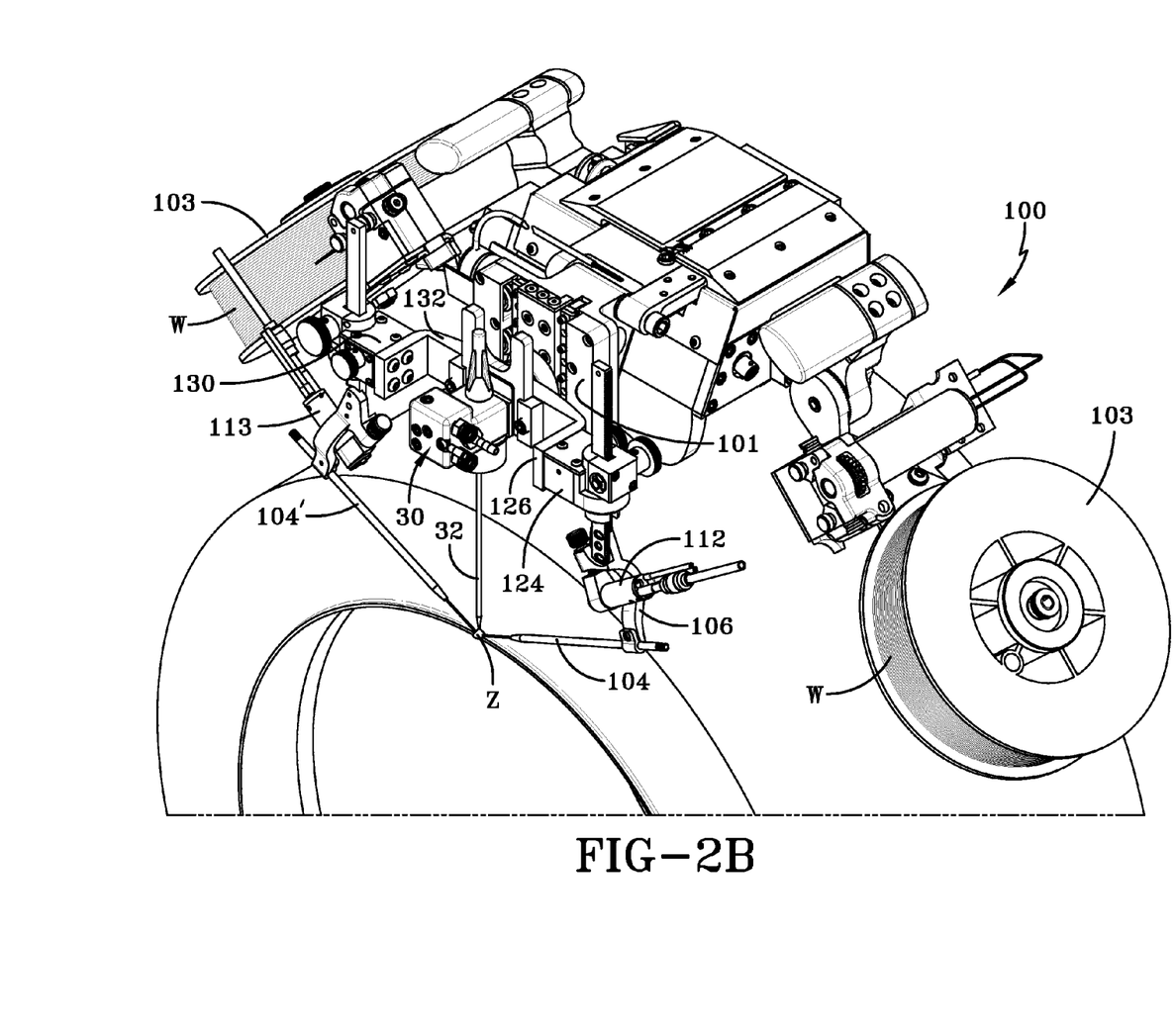
FIG. 2B illustrates a perspective view of an orbital welding system that includes a first mount system and a second mount system to support a camera device and a wire guide to position on a welding zone.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-6 illustrate a camera device and wire guide mounting system that is used with an automated or semi-automated welding system. One illustrative example of a welding system is orbital welding, which is often used for the joining of tubes or pipes of various types of materials. For example, a Tungsten Inert Gas (TIG) or Gas Tungsten Arc Welding (GTAW) welding torch may be used to orbit around the pipes to be welded together by an automated mechanical system. FIGS. 1-2B illustrates an example embodiment of orbital welding system 100 (also referred to as welder, system, and/or welder system) as used in an orbital welding environment. Orbital welding system 100 includes a welding tractor (not shown) that travels around the pipes or tubes, a welding power source (not shown) and controller (not shown), and a pendant (not shown) providing operator control.

System 100 (as seen in FIGS. 1-2B) is generally used in deep groove welding. In the example shown, welding system 100 includes an orbital TIG welder having a welder body or chassis 101, which may be attached to the work piece or supported on a track. Welder 100 includes a welding torch, generally indicated at 30, having a welding electrode 32 for depositing weld material to form a weld joint at welding zone Z. Electrode 32 is an extended electrode having an electrode length suitable for the groove G being welded. Extended electrode 32 may have any length suitable for a given deep groove weld, including lengths greater than 10 millimeters. As depicted in the example shown, electrode length may be greater than 100 millimeters. The particular example shown has a length of about 120 millimeters. This example is not limiting as electrodes having greater or lesser lengths may be used depending on the depth of the groove G.

Welding torch 30 is connected to a shield gas supply 106, that provides an inert gas, such as Argon gas, to welding torch 30. Welding gas supply 106 may include a container, such as a cylinder, that stores shield gas S under pressure, and delivery of shield gas S, via appropriate tubing or other conduits, may be controlled by a regulator or other controller 107. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welder may include a wire feeder connected to a supply of welding wire, such as a spool 103 that provides tungsten wire W to one or more wire guides 104', 104. In the example shown, a pair of extended wire guides 104', 104 are provided and fed by independent spools 103 located on either side of chassis 101. The extended wire guides 104', 104 are supported on first camera device and wire guide system 105 (also referred to as first mount system 105) and second camera device and wire guide system 106 (also referred to as second mount system 106) respectively that are each laterally outward of electrode 32 and above the workpiece or pipe P. Wire guides 104', 104 extend inward and downward toward electrode 32 and welding zone Z. The example welder is supported on a track and drive by a tractor drive around pipe with wire guides 104', 104 being located in lead and lag positions relative to welding electrode 32. First mount system 105 is coupled to height adjustment device 130 that allows adjustment of first mount system 105 toward welding zone Z or away welding zone Z. Height adjustment device 130 is further coupled to support member 132 that is coupled to a portion of chassis 101 of welder system 100. Similarly, second mount system 106 is coupled to height adjustment device 124 that allows adjustment of second mount system 106 toward welding zone Z or away welding zone Z. Height adjustment device 124 is further coupled to support member 126 that is coupled to a portion of chassis 101 of welder system 100. It is to be appreciated that first mount system 105 and height adjustment device 130 can be referred to as a camera device and wire guide system and second mount system 106 and height adjustment device 124 can be referred to as a camera device and wire guide system.

First mount system 105 supports camera device 113, camera device first portion 114, camera device second portion 116, and wire guide 104', wherein both camera device 113 and wire guide 104' are positioned to aim on or toward welding zone Z. Similarly, second mount system 106 supports camera device 112 and wire guide 104, wherein both camera device 112 and wire guide 104 are positioned to aim on or toward welding zone Z. In other words, first mount system 105 and second mount system 106 allow camera device alignment in which a view of camera device is focused on welding zone Z which is also where wire guides 104', 104 feed wire for depositing welding material. Thus, first mount system 105 connects camera device 113 to wire guide 104' to allow independent alignment or positioning of one another. It is to be appreciated that first mount system 105 afford alignment or positioning of camera device 113 and wire guide 104' together. Once configured in terms of alignment or positioning, camera device 113 and wire guide 104' move together with welder system 100 which enables camera device 113 to capture media consistently at welding zone Z and/or where wire is feed from wire guide 104'. Furthermore, second mount system 106 connects camera device 112 to wire guide 104 to allow independent alignment or positioning of one another. It is to be appreciated that second mount system 106 afford alignment or positioning of camera device 112 and wire guide 104 together. Once configured in terms of alignment or positioning, camera device 112, camera device first portion 118, camera device second portion 120, and wire guide 104 move together with welder system 100 which enables camera device 112 to capture media consistently at welding zone Z and/or where wire is feed from wire guide 104.

It is to be appreciated that camera devices 112, 113 can be any suitable device that captures media (e.g., video, images, pictures, among others) such as a camera, a video camera, a web camera, a thermal imaging device, a thermal device, an infrared camera, among others. Still, any camera device may be chosen with sound engineering judgment without departing from the intended scope of coverage of the embodiments of the subject invention. First mount system 105 and/or second mount system 106 are constructed from a combination of materials selected from the group consisting of a copper, an alloy of copper, beryllium copper, copper tungsten, a conductive metal, a steel, a ceramic, an aluminum, among others. Yet, any shape, size, dimensions, or material may be chosen with sound engineering judgment without departing from the intended scope of coverage of the embodiments of the subject invention.

System 100 provides a flexibility of adjustment for at least one of camera devices 112, 113 and wire guides 104, 104'. Camera devices 112, 113 can include eight (8) axes of camera movement (e.g., three (3) in conjunction with wire nozzle adjustment (e.g., also referred to as wire guide 104', 104) and five (5) independent of wire nozzle adjustment (e.g., wire guide 104', 104) which includes three (3) on a ball joint, one (1) in and out, and one (1) twisting). In an embodiment, a first arm of the bracket (e.g., first mount system 105 or second mount system 106) can be centered with the wire guide (e.g., wire guide 104' or wire guide 104) and moves side to side and up and down along with the wire dispensed so an image of the camera device remains locked on weld zone Z (discussed in more detail below).

Figure 3A:
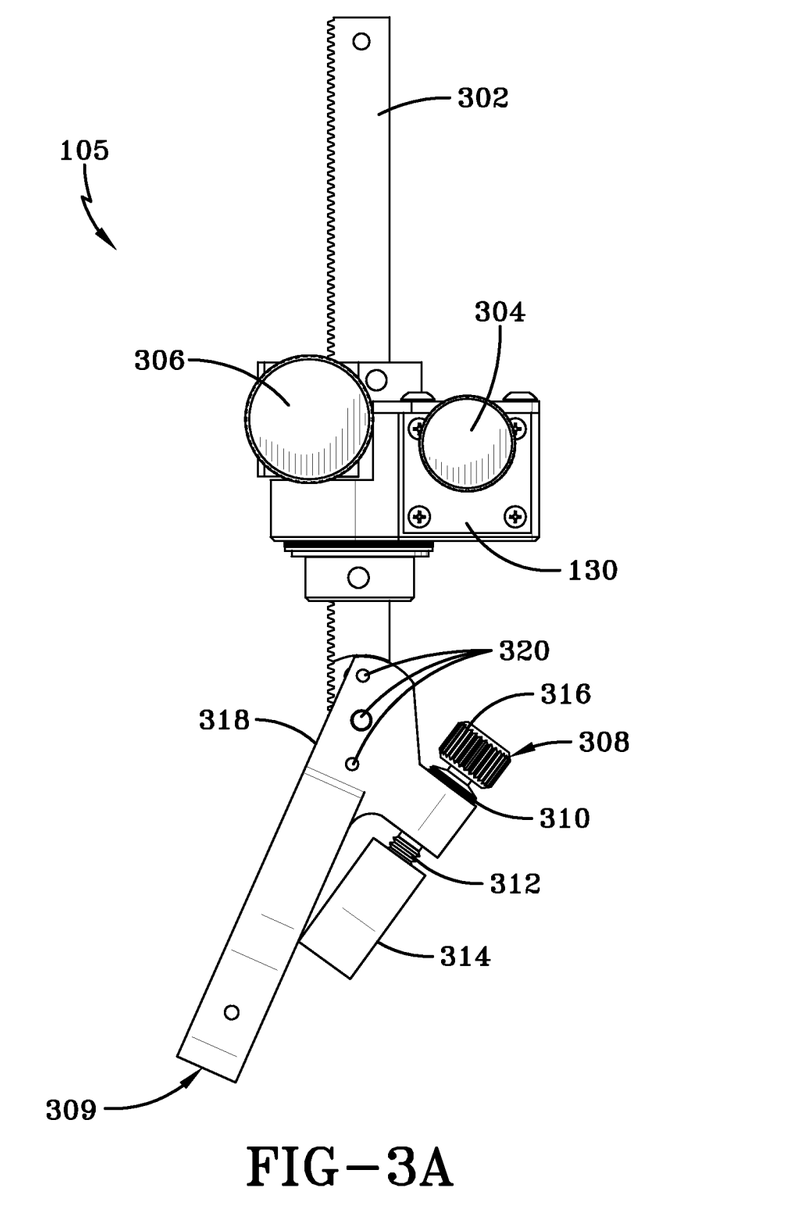
FIG. 3A illustrates a front view of a first camera device and wire guide system that supports a camera device and a wire guide for an orbital welding system.
Figure 3B:
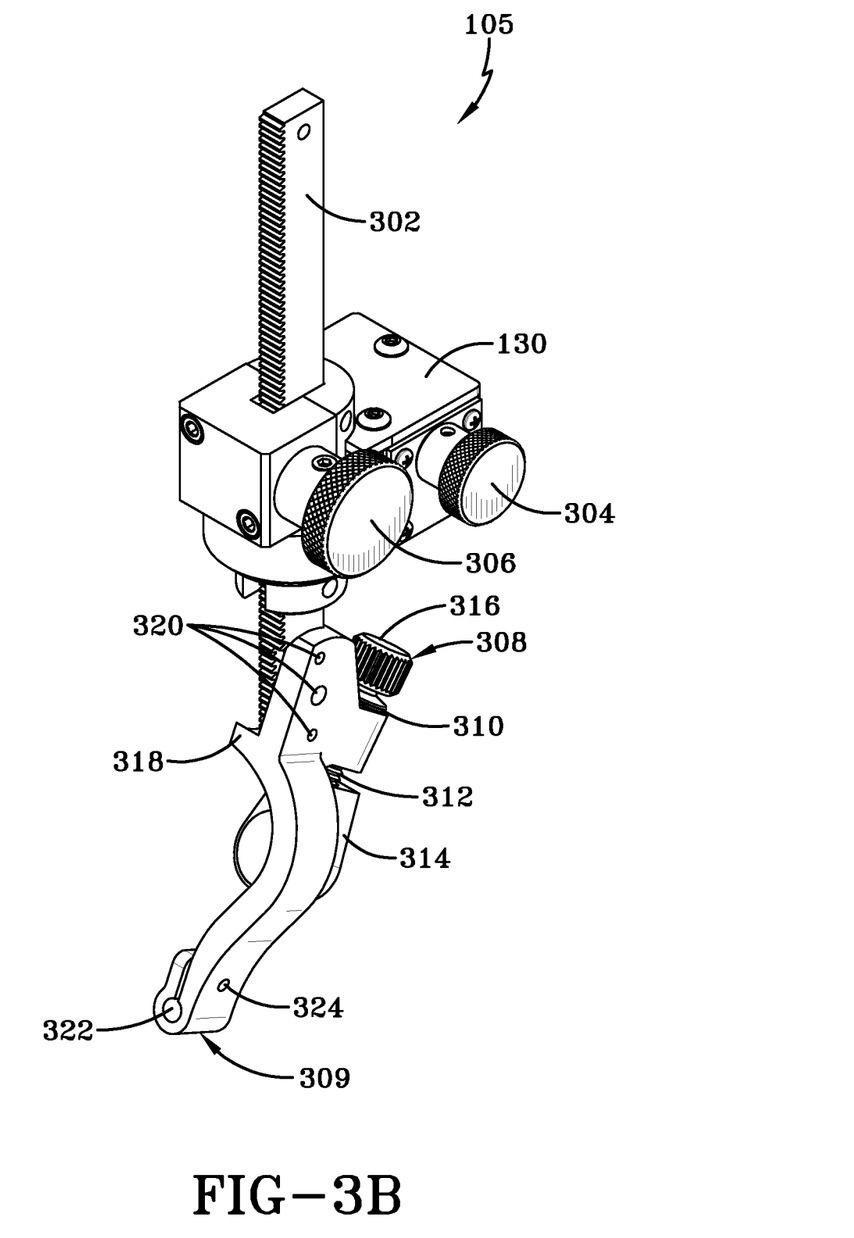
FIG. 3B illustrates a perspective view of a first camera device and wire guide system that supports a camera device and a wire guide for an orbital welding system.

Turning to FIGS. 3A and 3B, first mount system 105 is illustrated with a front view and a perspective view respectively. First mount system 105 includes height adjustment device 130 that includes rail 302, knob 304, and knob 306. Height adjustment device 130 utilizes rail 302 to move in a vertical direction (e.g., toward the workpiece and welding zone Z or away from the workpiece and welding zone Z). Rail 302 can include a plurality of teeth to which a gear engages in a rack and pinion fashion (not shown but discussed in FIG. 6) is turned to enable movement. It is contemplated that other linear actuators may be used to the same effect as the rack and pinion system shown.

Rotation of gear can be facilitated by knob 306. It is to be appreciated that reference to knob 306 includes other suitable mechanism (e.g., crank, screw, lever, electrical device, among others) that turns or rotates the gear to move about the plurality of teeth. Height adjustment device 130 further includes knob 304 that is configured to enable an adjustment of movement for first mount system 105. For instance, turning knob 304 can maneuver first mount system 105 forward or backward (e.g., referring to FIG. 2, forward direction is to the left and backward direction is to the right). It is to be appreciated that knob 304 can be any suitable mechanism (e.g., crank, screw, lever, electrical device, among others) that turns or rotates to move first mount system forward or backward based on the direction moved.

Rail 302 includes a top end and a bottom end opposite thereto, wherein the opposite end can include apertures 320 for connecting bracket 318 thereto via one or more fasteners. In an embodiment, apertures 320 allow further adjustment of bracket 318 in a horizontal direction (e.g., side to side direction in relation to welding zone Z) and/or vertical direction (e.g., up and down direction in relation to welding zone Z). For instance, bracket 318 can include a top aperture, a middle aperture, and a bottom aperture, wherein the top aperture and bottom aperture allow horizontal adjustment and/or vertical adjustment for bracket 318. In a particular embodiment, a top aperture and a bottom aperture can be capsule shaped to allow bracket 318 to be adjusted in a horizontal direction and/or vertical direction and secured with a fastener at a desired location.

Bracket 318 includes first arm 308 and second arm 309, wherein first arm 308 includes a top portion and a bottom portion opposite thereof, wherein the bottom portion includes camera device mount 314. It is to be appreciated that camera device mount 314 supports a camera device (e.g., camera device 113). First arm 308 resides in a first plane, whereas second arm 309 resides in a second plane (See FIG. 6 for discussion of first plane and second plane). The first plane and the second plane are separated by a distance D (See FIG. 6 for discussion of distance D). Second arm 309 further includes an offset portion (discussed in FIG. 6) lying in the second plane separated by the distance from the first plane to define a recess to receive a portion of the camera device 113, wherein second arm 309 includes wire guide mount 322 that supports the wire guide 104' in the first plane to aim in a position on welding zone Z. Wire guide 104' can be secured to wire guide mount 322 via a fastener that couples with or through aperture 324.

In an embodiment, second arm 309 includes a first transition area (discussed in FIG. 6) that transitions from the top portion to the offset portion (discussed in FIG. 6) and a second transition area (discussed in FIG. 6) that transitions from the offset portion to the wire guide mount. For instance, at least one of the first transition area or the second transition area can be, but is not limited to being, a curved member, a non-curved member, a continuous curve, an angled member, a combination thereof.

In an embodiment, first arm 308 includes a thumbscrew 316 that includes a top portion and a bottom portion opposite thereof, wherein the bottom portion includes threaded section 310. Threaded section 310 can be inserted into an aperture on bracket 318 and on top of a bulb (not shown but discussed in FIG. 6), wherein the bulb includes a ball and threaded neck 312. Threaded neck 312 couples to camera device mount 314, wherein threaded neck 312 provides adjustment of a position for first arm 308. It is to be appreciated that thumbscrew 316 and bulb provide a ball joint that enables 360 degree motion for first arm 308 and, in turn, camera device mount 314 and/or camera device 113.

Figure 4A:
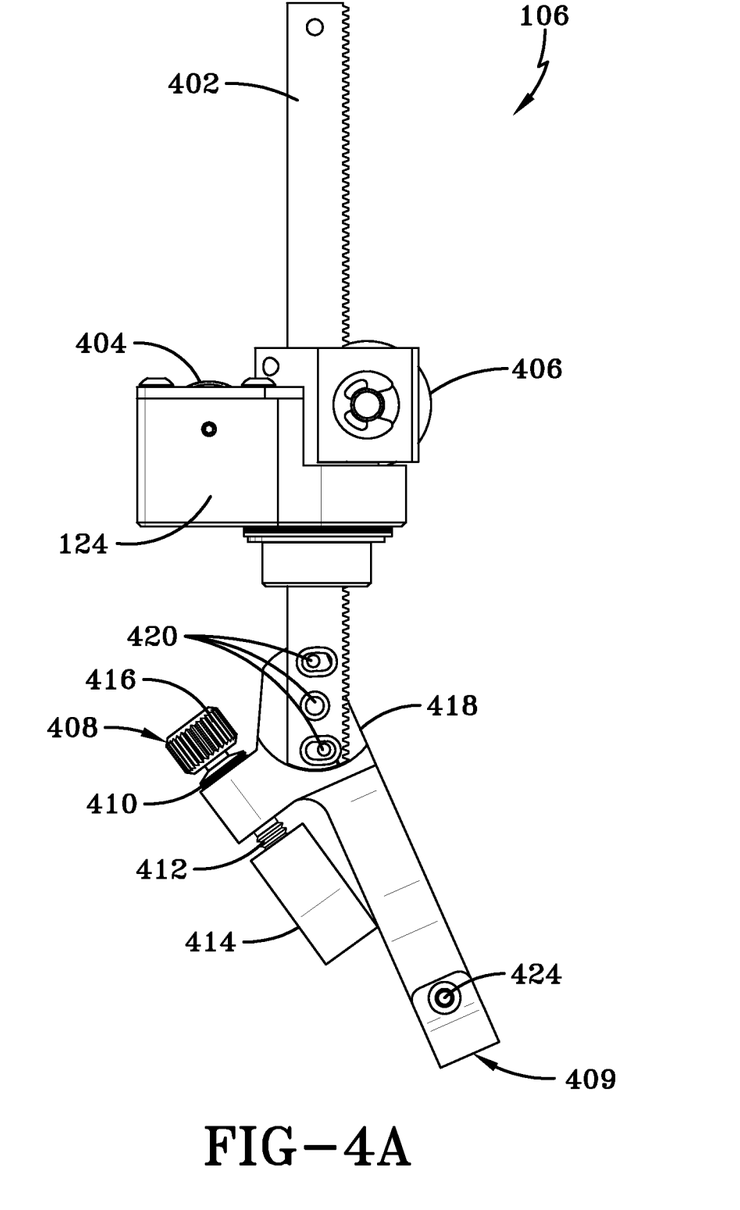
FIG. 4A illustrates a front view of a second camera device and wire guide system that supports a camera device and a wire guide for an orbital welding system.

It is to be appreciated that a back view of first mount system 105 in FIG. 3A can be substantially similar to a front view of second mount system 106 in FIG. 4A. For instance, a back view of the at least one of bracket 318, rail 302, and/or height adjustment device 130 can be substantially similar to the bracket 418, rail 402, and/or height adjustment device 124 in FIG. 4A. Additionally, a back perspective view for first mount system 105 in FIG. 3B can be substantially similar to the front perspective view of second mount system 106 in FIG. 4B. For instance, a back view of the at least one of bracket 318, rail 302, and/or height adjustment device 130 can be substantially similar to the bracket 418, rail 402, and/or height adjustment device 124 in FIG. 4A.

Figure 4B:
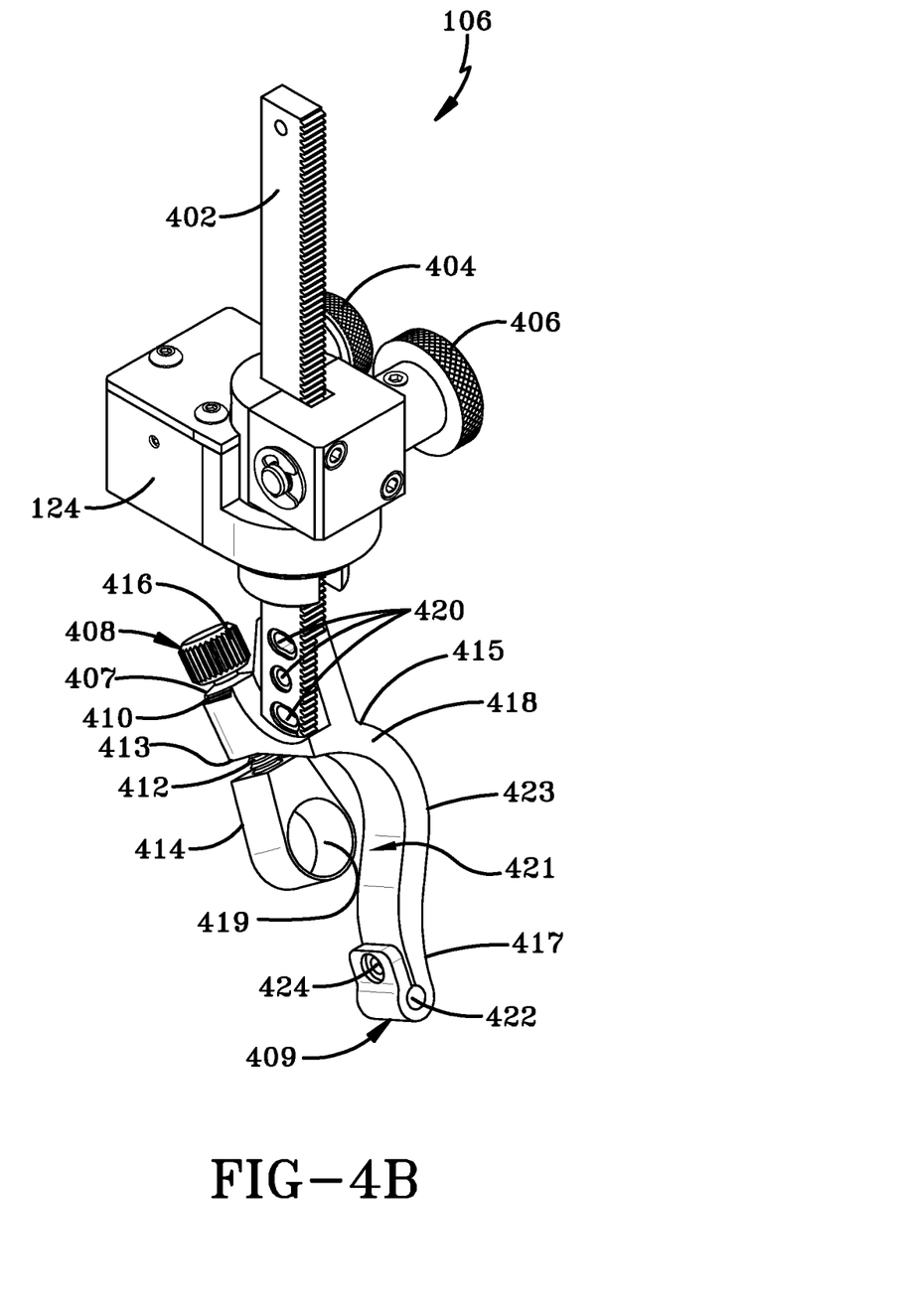
FIG. 4B illustrates a perspective view of a second camera device and wire guide system that supports a camera device and a wire guide for an orbital welding system.

Turning to FIGS. 4A and 4B, second mount system 106 is illustrated in a front view and a perspective view respectively. Second mount system 106 includes height adjustment device 124 that includes rail 402, knob 404, and knob 406. Height adjustment device 124 utilizes rail 402 to move in a vertical direction (e.g., toward the workpiece and welding zone Z or away from the workpiece and welding zone Z). Rail 402 can include a plurality of teeth to which a gear (not shown but discussed in FIG. 6) is turned to enable movement. The gear can be moved by knob 406. However, it is to be appreciated that knob 406 can be any suitable mechanism (e.g., crank, screw, lever, electrical device, among others) that turns or rotates the gear to move about the plurality of teeth. Height adjustment device 124 further includes knob 404 that is configured to enable an adjustment of movement for second mount system 106. For instance, turning knob 404 can maneuver second mount system 106 forward or backward (e.g., referring to FIG. 2, forward direction is to the left and backward direction is to the right). It is to be appreciated that knob 404 can be any suitable mechanism (e.g., crank, screw, lever, electrical device, among others) that turns or rotates to move first mount system forward or backward based on the direction moved.

Rail 402 includes a top end and a bottom end opposite thereto, wherein the opposite end can include apertures 420 for connecting bracket 418 thereto via one or more fasteners. In an embodiment, apertures 420 allow further adjustment of bracket 418 in a horizontal direction (e.g., side to side direction in relation to welding zone Z) and/or vertical direction (e.g., up and down direction in relation to welding zone Z). For instance, bracket 418 can include a top aperture, a middle aperture, and a bottom aperture, wherein the top aperture and bottom aperture allow horizontal adjustment and/or vertical adjustment for bracket 418. In a particular embodiment, a top aperture and a bottom aperture can be capsule shaped to allow bracket 418 to be adjusted in a horizontal direction and/or vertical direction and secured with a fastener at a desired location.

Bracket 418 includes first arm 408 and second arm 409, wherein first arm 408 includes a top portion 407 and a bottom portion 413 opposite thereof, wherein the bottom portion includes camera device mount 414. It is to be appreciated that camera device mount 414 supports a camera device (e.g., camera device 112). First arm 408 resides in a first plane, whereas second arm 409 resides in a second plane (See FIG. 6 for discussion of first plane and second plane). The first plan and the second plane are separated by a distance D (See FIG. 6 for discussion of distance D). Second arm 409 further includes an offset portion (discussed in FIG. 5) lying in the second plane separated by the distance from the first plane to define a recess to receive a portion of the camera device 112, wherein second arm 409 includes wire guide mount 422 that supports the wire guide 104 in the first plane to aim in a position on welding zone Z. Wire guide 104 can be secured to wire guide mount 422 via a fastener that couples with or through aperture 424. As illustrated by a combination of FIG. 1 and FIG. 4B, camera device 113 is supported by insertion of first portion 114 of camera device into aperture 419 of camera device mount 414 after insertion of second portion of camera device 116 through second receiving portion 421 of offset portion 423 of connecting bracket 418.

In an embodiment, second arm 409 includes a first transition area (discussed in FIG. 5) that transitions from the top portion to the offset portion 613 (discussed in FIG. 5) and a second transition area (discussed in FIG. 5) that transitions from the offset portion to the wire guide mount. For instance, at least one of the first transition area or the second transition area can be, but is not limited to being, a curved member, a non-curved member, a continuous curve, an angled member, a combination thereof.

In an embodiment, first arm 408 includes a thumbscrew 416 that includes a top portion and a bottom portion opposite thereof, wherein the bottom portion includes threaded section 410. Threaded section 410 can be inserted into an aperture on bracket 418 and on top of a bulb (not shown but discussed in FIG. 6), wherein the bulb includes a ball and threaded neck 412. Threaded neck 412 couples to camera device mount 414, wherein threaded neck 412 provides adjustment of a position for first arm 408. It is to be appreciated that thumbscrew 416 and bulb provide a ball joint that enables 360 degree motion for first arm 408 and, in turn, camera device mount 414 and/or camera device 112.

It is to be appreciated that a back view of second mount system 106 in FIG. 4A can be substantially similar to a front view of first mount system 105 in FIG. 3A. For instance, a back view of the at least one of bracket 418, rail 402, and/or height adjustment device 124 can be substantially similar to the bracket 318, rail 302, and/or height adjustment device 130 in FIG. 3A. Additionally, a back perspective view for second mount system 106 in FIG. 4B can be substantially similar to the front perspective view of first mount system 105 in FIG. 3B. For instance, a back view of the at least one of bracket 418, rail 402, and/or height adjustment device 124 can be substantially similar to the bracket 318, rail 302, and/or height adjustment device 130 in FIG. 3A.

Figure 5:
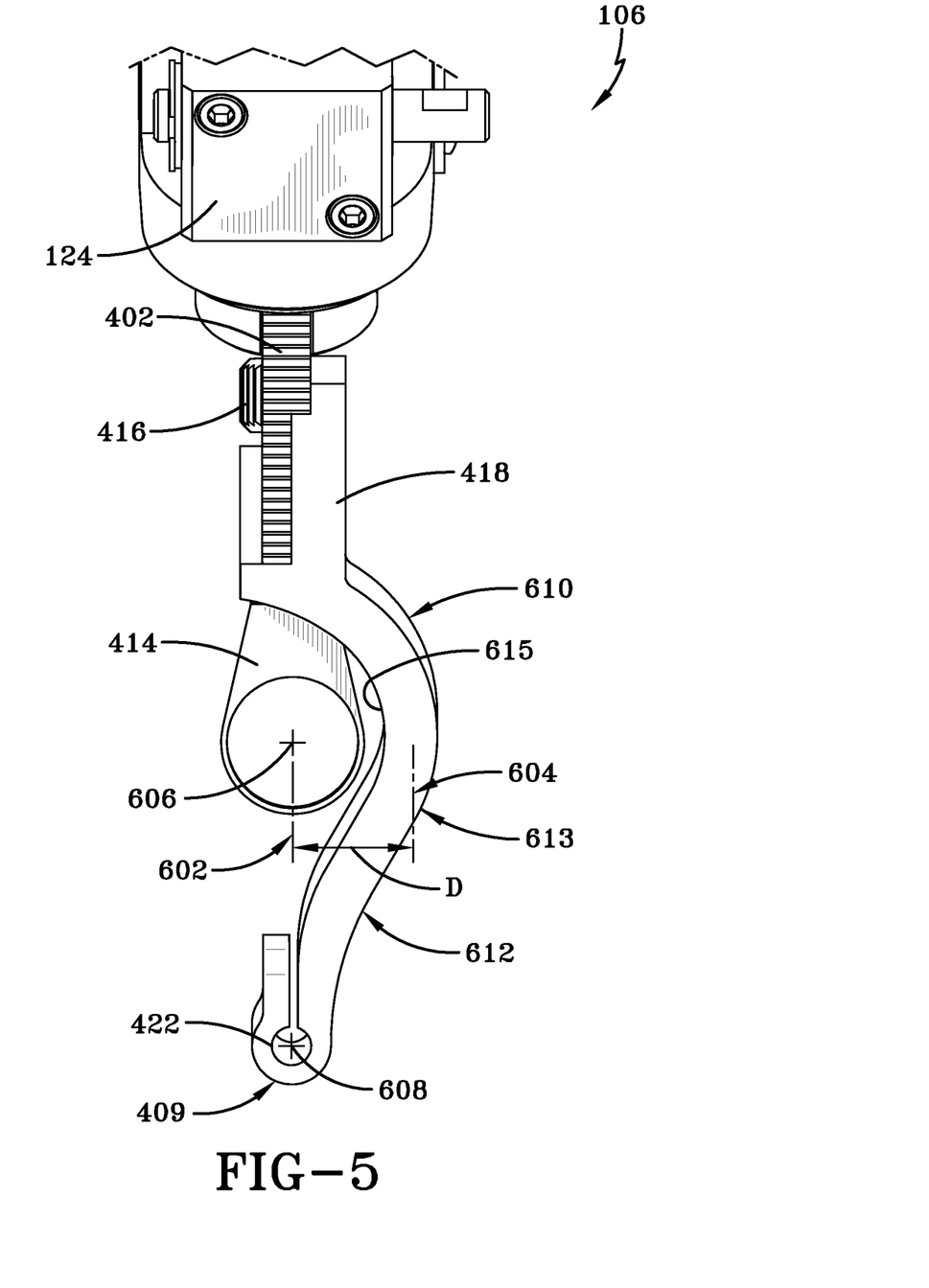
FIG. 5 illustrates a side view of a second camera device and wire guide system that supports a camera device and a wire guide for an orbital welding system.

FIG. 5 illustrates a side view of second mount system 106 that supports camera device 112 and wire guide 104 for orbital welding system 100. As discussed above, a first arm (e.g., first arm 308, first arm 408) of a mount system (e.g., first mount system 105, second mount system 106) can reside in first plane 602 that is separated by distance D from second plane 604. A second arm (e.g., second arm 309, second arm 409) can include offset portion 613 lying in second plane 604 separated by distance D from first plane 602 defining a recess 615 to receive at least a portion of the camera device (e.g., camera device 113, 112). In an embodiment, the first arm (e.g., first arm 308, first arm 408) includes camera device mount (e.g., camera device mount 314, camera device mount 414) that has an aperture to receive a camera device. Moreover, first transition area 610 (e.g., discussed in FIGS. 3A, 3B, 4A, and 4B) is illustrated on the second arm. Additionally, second transition area 612 (e.g., discussed in FIGS. 3A, 3B, 4A, and 4B) is illustrated on second arm. In this particular example, first transition area 610 and second transition area 612 are depicted as curved members but is it to be appreciated and understood that either first transition 610 area or second transition area 612 can be at least one of a curved member, a non-curved member, an angled member, a continuous curved member, among others.

For instance, the camera device mount can include an aperture that receives a portion of the camera device, wherein the aperture can include center point 606. The wire guide mount (e.g., wire guide mount 322, 422) can include an aperture that receives a portion of a wire guide (e.g., wire guide 140', 104), wherein the aperture can include center point 608. In accordance with an aspect of the subject innovation, center point 606 resides in the same plane as center point 608. In a particular example, center point 606 and center point 608 reside in first plane 602. It is to be appreciated that although FIG. 6 illustrates a side view of second mount system 106 and that first plane 602, second plane 604, distance D, center point 606, and/or center point 608 can correspond to first mount system 105 and are not limited to second mount system 106.

Figure 6:
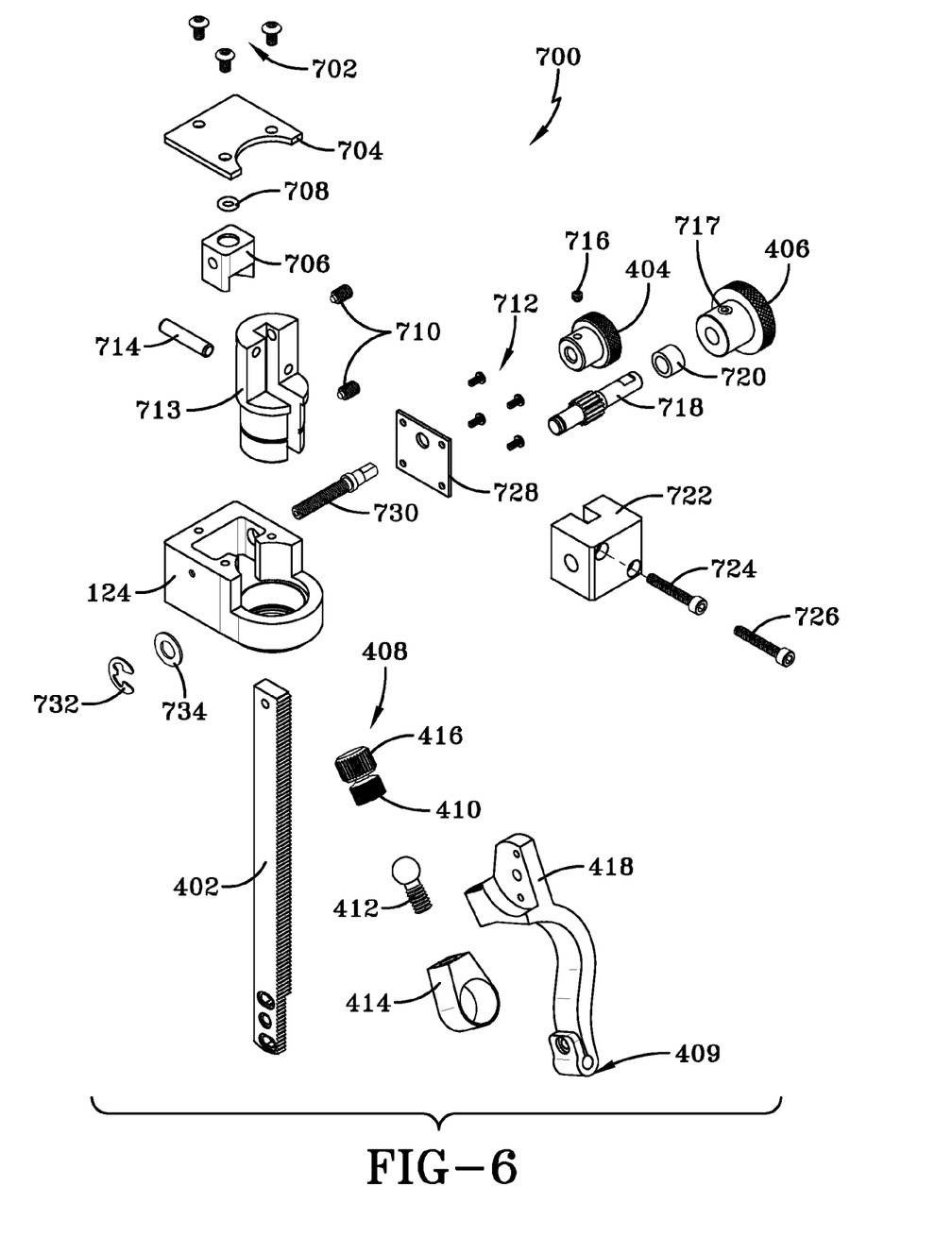
FIG. 6 illustrates an exploded view of a second camera device and wire guide system that supports a camera device and a wire guide for an orbital welding system.

FIG. 6 illustrates an exploded view of a mount system (e.g., first mount system 105, second mount system 106) that supports a camera device and a wire guide for orbital welding system 100. It is to be appreciated that the exploded view of second mount system 106 and that any parts, elements, and/or features can correspond to first mount system 105 and are not limited to second mount system 106. Second mount system 106 includes bracket 418 that includes first arm 408 and second arm 409. First arm includes thumbscrew 416 with threaded section 410, bulb 412, and camera device mount 414. Second mount system 106 further includes height adjustment device 124 that has gear 718, cylinder 720, knob 406, knob 404, fastener 716, fasteners 712, plate 728, member 722, fastener 724, fastener 726, adjustment screw or fastener 730, fasteners 710, member 713 that receives rail 402, fastener 717, cylinder 714, washer 734, washer or portion of washer 732, member 706, washer 708, plate 704, and/or fasteners 702.

In an embodiment, a welder system is provided wherein the first arm further includes a thumbscrew that couples to a bulb, wherein the bulb includes a neck on a bottom portion and a ball on a top portion. In the embodiment, the thumbscrew and the bulb adjust a focus location of the camera device, wherein upon tightening the thumbscrew stabilizes a position for the bulb and the camera device. In an embodiment, the second arm further includes a top portion and a bottom portion opposite thereof, the bottom portion includes the wire guide mount. In the embodiment, the second arm further includes a first transition area that transitions from the top portion to the offset portion and a second transition area that transitions from the offset portion to the wire guide mount. In the embodiment, the first transition and the second transition are a curved member. In the embodiment, the at least portion of the camera device is cylindrical in shape. In an embodiment, the first transition and the second transition are a continuous curve. In an embodiment, at least one of the first transition or the second transition are a non-curved member.

In an embodiment, a welder system includes a support member that affixes the bracket to the chassis. In an embodiment, a welder system includes a height adjustment device having a rail with a gear that fits to a plurality of teeth, wherein the rail includes an end that couples to the bracket. In such embodiment of the welder system, the height adjustment device and the bracket move based on the gear, the movement is at least one of toward the welding zone or away the welding zone. In the embodiment, the height adjustment device is coupled to the chassis. In an embodiment, a welder system includes a support member that affixes the bracket to the height adjustment device and the height adjustment device to the chassis. In an embodiment, the welder system includes at least one fastener that couples the bracket to the rail while providing an adjustment of the bracket in a horizontal plane.

In an embodiment, a bracket is provided that includes a height adjustment device that utilizes a gear and a plurality of teeth to adjust a height of the bracket. In an embodiment, the bracket includes a second arm that further includes a top portion and a bottom portion opposite thereof. In the embodiment, the bracket includes a first transition that transitions from the top portion to the offset portion and a second transition that transitions from the offset portion to at least one of the wire guide mount or the bottom portion.

In an embodiment, the bracket includes at least one of the first transition or the second transition is a curved member. In an embodiment, the at least one of the first transition or the second transition is a non-curved member. In an embodiment, the bracket includes the first arm with a ball joint that provides a 360 degree adjustment for the first arm to aim the camera device in a position on the welding zone. In an embodiment of the bracket, at least one of the first arm or the second arm are constructed from a material selected from the group consisting of a copper, an aluminum, an alloy of copper, beryllium copper, copper tungsten, a conductive metal, a steel, or a ceramic.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A bracket for mounting a camera device to a welder system, comprising:
    a first arm situated in a first plane that includes a top portion and a bottom portion opposite thereof;
    the bottom portion includes a camera device mount that receives a first portion of a camera device,
    wherein the camera device is positioned to focus on a welding zone;
    a second arm having an offset portion lying in a second plane separated by a distance from the first plane to define a recess to receive a second portion of the camera device,
    wherein the second arm includes a wire guide mount that supports the wire guide in the first plane to provide a portion of welding wire to the welding zone; and
    a center point of the camera mount device lies in the same plane as a center point of the wire guide mount.

2. The bracket of claim 1, further comprising a height adjustment device that utilizes a gear and a plurality of teeth to adjust a height of the bracket.

3. The bracket of claim 1, wherein
    the second arm further comprises: a top portion and a bottom portion opposite thereof;
    a first transition that transitions from the top portion to the offset portion; and
    a second transition that transitions from the offset portion to at least one of the wire guide mount or the bottom portion.

4. The bracket of claim 3, wherein
    at least one of the first transition or the second transition is a curved member.

5. The bracket of claim 3, wherein
    at least one of the first transition or the second transition is a non-curved member.

6. The bracket of claim 1, wherein
    the first arm threadably rotates 360 degrees to adjust the first arm to aim the camera device in a position on the welding zone.

7. The bracket of claim 1, wherein
    at least one of the first arm or the second arm are constructed from a material selected from the group consisting of a copper, an alloy of copper, beryllium copper, copper tungsten, a conductive metal, a steel, an aluminum, or a ceramic.

* * * * *